Feb. 11, 1958  R. LEE  2,822,697
FLEXIBLE DRIVE MECHANISM
Filed Sept. 26, 1952
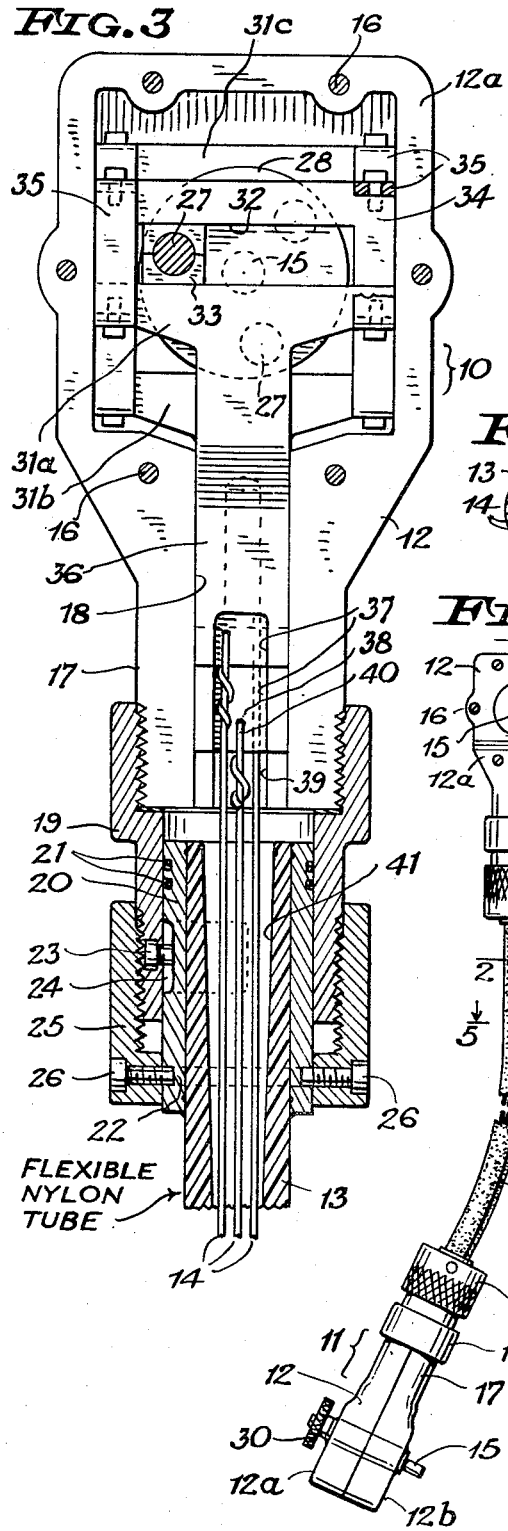
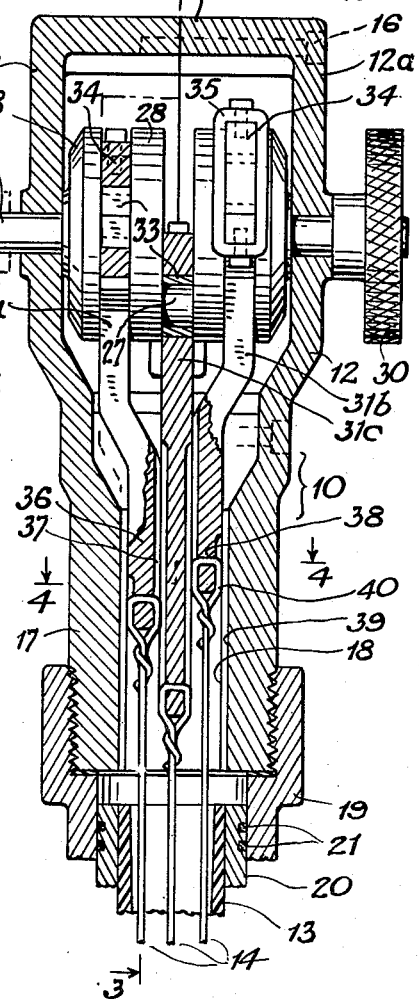
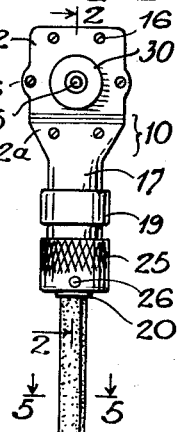
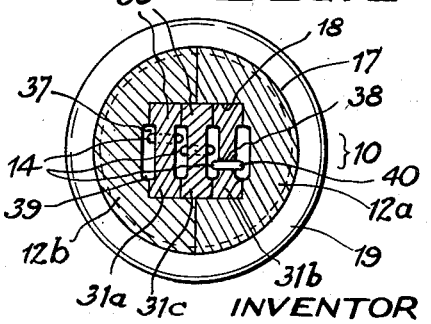
INVENTOR
ROYAL LEE
BY Christopher L. Waal
ATTORNEY

United States Patent Office 2,822,697
Patented Feb. 11, 1958

2,822,697

FLEXIBLE DRIVE MECHANISM

Royal Lee, Elm Grove, Wis., assignor to Lee Engineering Company, Milwaukee, Wis., a corporation of Wisconsin Application September 26, 1952, Serial No. 311,647

4 Claims. (Cl. 74—63)

The present invention relates to mechanical movements, and more particularly to flexible drive mechanism.

An object of the invention is to provide an improved flexible drive mechanism in which motion is transmitted to a rotary member through reciprocatory means.

Another object is to provide a drive mechanism which will minimize back lash and which will permit driving of the rotary member in either direction.

A further object is to provide a flexible drive mechanism which is of simple and durable construction and which can be inexpensively manufactured.

The invention further consists in the several features hereinafter described and claimed.

In the accompanying drawings,

Fig. 1 is an elevational view of a flexible drive mechanism constructed in accordance with the invention;

Fig. 2 is a longitudinal sectional view of one of the end heads of the mechanism taken generally on the line 2—2 of Fig. 1;

Fig. 3 is a longitudinal sectional view of this end head taken on the line 3—3 of Fig. 2;

Fig. 4 is a transverse sectional view taken generally on the line 4—4 of Fig. 2, and Fig. 5 is a transverse sectional view taken on the line 5—5 of Fig. 1.

In the drawing, 10 and 11 designate driving and driven heads of generally similar construction having respective casings 12 secured to the opposite ends of a somewhat flexible tube 13 of cylindrical cross-section, such as of thick-walled nylon tubing. The tube forms a housing for three reciprocatory motion-transmitting wires 14, such as of steel or other suitable metal, connected at opposite ends to a pair of multiple-throw crank shafts 15 journalled in the respective head casings, as hereinafter more fully described.

Each of the head casings 12 is longitudinally split and is formed by a pair of complementary sections 12a and 12b suitably secured together as by screws 16. Each casing has a cylindrical end portion 17 in which is formed an axial guide opening 18 of rectangular cross-section. A cylindrical extension sleeve 19 is screw-threaded onto the cylindrical end portion 17 of the casing and slidably receives therein a ferrule 20 which is suitably secured on the end of the flexible housing tube 13, the ferrule and tube end being coaxial with the casing opening 18. The ferrule is provided near one end with one or more annular sealing rings 21 engaging the inner surface of the extension sleeve, and is provided near the other end with an annular groove 22, Fig. 3. A radial screw or pin 23 in the extension sleeve 19 engages in a longitudinally extending groove or pocket 24 in the ferrule to limit rotation of the ferrule and sleeve. An adjusting or take-up collar 25 is screw-threaded onto the extension sleeve 19 and is provided with radial pins or screws 26 the inner ends of which slidably fit in the ferrule groove 22. Rotative adjustment of the collar will thus effect relative axial shifting of the head and the adjacent end of the flexible tube.

The multiple-throw crank shafts 15 extend transversely in the respective head casings 12 and each includes three crank pins 27 spaced 120° apart and rigidly connected to flat-faced crank disks 28. Each crank shaft has ends projecting from opposite sides of the casing, one end of the driving crank shaft being coupled to a rotary power input member 29, Fig. 2, and the other end of each crank shaft having a knurled knob or wheel 30 to permit manual rotation or angular adjustment of the crank shaft.

Three cross heads or Scotch yokes 31a, 31b, and 31c cooperate with the respective crank pins 27 and each slidably fits between adjacent crank disks. Each crank pin passes through a transverse parallel-sided slot 32 of the corresponding cross head and is preferably journalled in a bearing block 33, such as of nylon or Bakelite, slidably fitting in the slot. The slotted end portion of each cross head is formed by a C-shaped bar 34 the opposite ends of which are rigidly secured to the main body of the cross head, as by loop members 35 pinned or screwed in place. The three cross heads have flat laterally abutting shanks or stems 36 which are slidably confined in the casing guide opening 18. The intermediate cross head 30c is straight, while the two outer cross heads 30a and 30b, which are identical, each have an offset shank. The cross head shanks have shallow longitudinally extending channels 37 at opposite faces and have respective transverse bores 38 opening at the channels. The transverse bore in the shank of the intermediate cross head is disposed at the longitudinal center line of the shank, while the transverse bores in the shanks of the outer cross heads are laterally offset from the center lines of these shanks, as seen in Figs. 3 and 4. The guide opening 18 of the casing includes longitudinally extending clearance channels 39 confronting the adjacent channels of the outer cross head shanks. The three reciprocatory wires 14 are suitably secured at opposite ends of the respective cross head shanks, as by inserting the wire ends through the shank bores 38 and twisting the wire ends to form loops 40, the twisted end portions of the wires being suitably secured as by brazing. The arrangement of the transverse bores 38 in the cross head shanks facilitates attachment of the wires. The link-forming wires are slidably housed in the flexible tube 13, and after assembly of the device the wires are made taut by adjusting one or both of the screw collars 25. If desired, each end portion 41 of the bore of the tube 13 may be slightly flared, as seen in Fig. 3. The wires and other moving parts are suitably lubricated, as by graphite or silicone grease. The channels in the cross head shanks and casing provide lubricant passages. The link-forming wires are closely adjacent to each other and to the axis of the flexible tube 13, as seen in Fig. 5, and are adapted to contact each other and the inner walls of the relatively small bore of the tube when the tube is laterally flexed.

When the drive mechanism is in use, the crank shaft 15 of one of the heads, for example the head 10, is coupled to a source of power by which it is rotated in either direction, and the crank shaft of the other head is coupled to a driven member, not shown. The rotation of the crank shaft in the driving head 10 reciprocates the associated cross heads or Scotch yokes therein, thereby reciprocating the connected flexible wires 14 and the cross heads in the head 11, so as to rotate the crank shaft in the latter head. The power is transmitted by pull on the wires, which reciprocate 120° out of phase, thus providing smooth operation and avoiding dead centering. The spacing of the heads is maintained by the nylon tube 13 which resists longitudinal compression, so as to minimize back lash. However, the tube 13 can be laterally flexed, as indicated in Fig. 1, without appreciably affecting the tautness of the wires which lie close to the longitudinal axis of the tube, and the two heads can be relatively rotated through a limited angle. Angular adjustment or "inching" of the crank shaft in the driven head 11 can be effected by rotating the knob 30 at either head.

The flexible drive mechanism of the invention can be used for driving various devices, such as tachometers, handpieces and cameras.

What I claim as new and desire to secure by Letters Patent is:

1. In a drive mechanism, a pair of casings, a flexible tubular member connected at opposite ends to said casings, a pair of multiple-throw crank shafts rotatably mounted in said respective casings and each having a plurality of at least three angularly spaced crank pins, cross heads reciprocably mounted in said casings for parallel motion therein and having operative connections with the respective crank pins, the cross heads in each casing having laterally adjacent parallel shanks slidable in said casing, the shanks of the outermost cross heads being offset inwardly, and reciprocatory link-forming wires extending longitudinally in said tubular member and slidable therein in laterally adjacent relation, each wire being flexible and connected at opposite ends to the corresponding cross head shanks in said casings for transmitting motion between said crank shafts, said wires lying relatively close to the longitudinal axis of said tubular member.

2. In a drive mechanism, a pair of spaced multiple-throw crank shafts, casing means for rotatably mounting said crank shafts, reciprocatory link means connecting said crank shafts and comprising a plurality of reciprocatory, flexible, tension-transmitting members arranged in out-of-phase relation, flexible, tubular guiding means in which said flexible members are slidably confined, and take-up means cooperating with said casing means for removing slack from said flexible members, said flexible tension-transmitting members lying relatively close to the longitudinal axis of said tubular guiding means.

3. In a drive mechanism, a pair of spaced multiple-throw crank shafts, casing means for rotatably mounting said crank shafts, reciprocatory link means connecting said crank shafts and comprising a plurality of reciprocatory, flexible, tension-transmitting members arranged in out-of-phase relation, flexible tubular guiding means in which said flexible members are slidably confined in laterally adjacent relation, and take-up means operatively connected with said tubular guiding means for removing slack from said flexible members, said flexible tension-transmitting members lying relatively close to the longitudinal axis of said tubular guiding means.

4. In a drive mechanism, a pair of rotary members, reciprocatory link means having motion-converting connections with said rotary members and comprising a plurality of at least three reciprocatory, flexible, tension-transmitting members movable in out-of-phase relation, a flexible tubular guiding member in which said flexible members are slidably confined in laterally adjacent relation, said flexible members lying relatively close to the longitudinal axis of said tubular guiding member, and take-up means operatively connected with said tubular guiding member for removing slack from said flexible members.

References Cited in the file of this patent

UNITED STATES PATENTS

| 204,568 | Hawley | June 4, 1878 |
| 748,236 | Tuvell | Dec. 29, 1903 |
| 1,800,614 | Finley | Apr. 14, 1931 |
| 2,218,903 | Bratz | Oct. 22, 1940 |

FOREIGN PATENTS

| 352,900 | Germany | May 9, 1922 |
| 385,417 | Germany | Dec. 23, 1922 |